United States Patent [19]

Nishino

[11] Patent Number: 4,629,151

[45] Date of Patent: Dec. 16, 1986

[54] SEAT LIFTER

[75] Inventor: Takaichi Nishino, Akishima, Japan

[73] Assignee: Tachikawa Spring Co., Ltd., Tokyo, Japan

[21] Appl. No.: 753,445

[22] Filed: Jul. 10, 1985

[51] Int. Cl.[4] .................................. F16M 13/00
[52] U.S. Cl. .............................. 248/396; 248/421; 297/328
[58] Field of Search ............. 248/396, 394, 395, 397, 248/421, 424, 425, 429, 419, 423; 297/328, 326, 327; 296/69 R

[56] References Cited

U.S. PATENT DOCUMENTS

| | | | |
|---|---|---|---|
| 4,159,095 | 6/1979 | Pallant et al. | 248/396 |
| 4,222,543 | 9/1980 | Gedig et al. | 248/396 X |
| 4,422,611 | 12/1983 | Kitsuda | 248/394 X |
| 4,487,390 | 12/1984 | Miyashita | 248/396 |
| 4,513,937 | 4/1985 | Langmesser et al. | 248/396 X |

Primary Examiner—Ramon O. Ramirez
Attorney, Agent, or Firm—Hill, Van Santen, Steadman & Simpson

[57] ABSTRACT

The present invention relates to a seat lifter employed for a vehicle seat comprising a rotary fulcrum being mounted at the front portion of a seat cushion of the seat, a link mechanism for rotating the seat centering around the rotary fulcrum being mounted at the back portion thereof, a link mechanism for supporting and adjusting the link of said link mechanism by means of an offset pin formed projectly on a disc with a tooth groove being provided, thereby adjusting a seat angle and elevating the movement of the seat by rotary adjustment of the seat centering around the rotary fulcrum.

2 Claims, 7 Drawing Figures

SEAT LIFTER

BACKGROUND OF THE INVENTION

1. Field of the Invention:

The present invention relates to a seat lifter used for a vehicle seat, and more particularly relates to a seat lifter having a fulcrum at the front portion of a seat cushion and allowing adjustment of the vertical movement and of an angle of the seat.

2. Description of the Prior Art:

As shown in FIG. 1, according to a conventional seat lifter, a seat (1) is usually moved upwards and downwards from a position shown with a solid line to a position shown with a dashed line in a parallel manner, or as shown in FIG. 2 an angle adjustment of the seat (1) is carried out with a rotary fulcrum (3) at the back portion of a seat cushion (2) of the seat (1).

However, such a seat provided with a seat lifter of a parallel elevating type as in FIG. 1 is certainly found optimal in effecting the elevation adjustment of a hip point (Hp) which is the basis of the sitting posture of a passenger and an eye point which is the basis of the eye position of the passenger, but has been defective in that an angle adjustment of the seat cannot be effected.

Furthermore, according to a seat lifter capable of adjusting a seat angle as shown in FIG. 2, it permits adjustment of an angle of the seat, but cannot provide any capability to carry out the elevation adjustment thereof.

SUMMARY OF THE INVENTION

It is an object of the present invention to provide a seat lifter which permits adjustment of the vertical movement and an angle of a seat, with its mechanism constructed in a highly stable and rigid manner as a whole, and further, which can be so designed as to provide a thinner body.

In order to achieve the above-mentioned object, the present invention comprises a rotary fulcrum defined at the front portion of a seat cushion, a link mechanism mounted at the back portion of the seat cushion, the link mechanism being adapted for rotating the seat about the rotary fulcrum, a lock mechanism for adjustably supporting a link of said link mechanism by means of an offset pin projectingly mounted on a disc which has teeth grooves having a rotation latching means, thereby allowing adjustment of an angle of the seat and also the elevation thereof in response to the rotary adjustment of the seat relative to the rotary fulcrum.

The above-mentioned fulcrum is a portion defined on a cushion frame, in which the cushion frame is pivotally fixed to brackets mounted projectingly on the front portion of a pair of slide rails at both sides thereof by means of an axle pin and the seat cushion is mounted such that it can be moved in the forward and backward directions in the slide rails.

An arc link is mounted between the slide rail and the cushion frame so as to constitute the aforementioned link mechanism. The above mentioned disc, which has the teeth grooves for rotating and latching the arc link, is rotatably pivotally fixed to the cushion frame, and the offset pin is inserted into an elongated groove perforated in the link and so arranged eccentrically of the disc that it may be rotated interlockingly with the link. A stopper is engaged with one of the teeth grooves of the disc and the stopper is slidably supported on the cushion frame.

The cushion frame is normally biased by means of a torsion bar in a direction wherein the cushion frame is rotated about the rotary fulcrum and raised relative thereto.

A longitudinal groove is perforated in the stopper. Into this longitudinal groove is inserted one end portion of a crank which is so arranged that it is biased by a spring so as to cause the stopper to engage with the teeth grooves of the disc. A manual lever is fixed to an arbor of the crank.

DETAILED DESCRIPTION OF THE PREFERRED EMBODIMENTS

Figure 1:
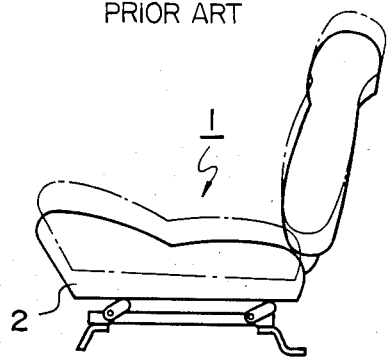
FIG. 1 is a side view of a seat provided with a conventional seat lifter for adjusting the seat parallelably and elevationally.
Figure 2:
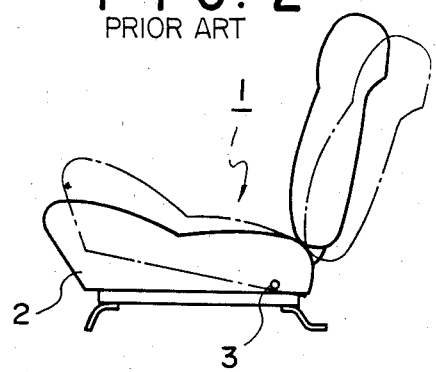
FIG. 2 is a side view of a seat provided with a conventional seat lifter for adjusting an angle of the seat.
Figure 3:
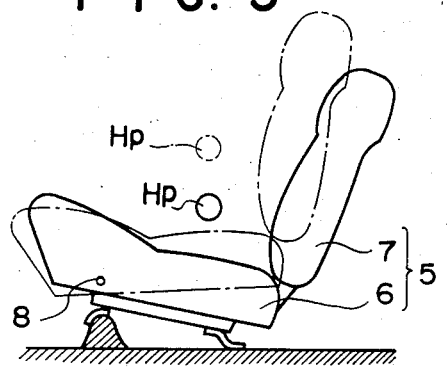
FIG. 3 is a side view of one embodiment of a seat provided with a seat lifter according to the present invention.

FIG. 3 is a side view of a vehicle seat provided with a seat lifter according to the present invention. In the Figure, (5) is a seat as a whole; (6) is a seat cushion; and (7) is a seat back. In the seat (5) a rotary fulcrum (8) is set up at the front portion of the seat cushion (6). Specifically, now reference is made to FIG. 4 in which is shown a cushion frame portion of the seat cushion (6). In such a manner, brackets (11) (11) are projectingly mounted at the front portion of a pair of slide rails (10) (10) on both sides thereof, each of which brackets is provided with an axle pin (12). A cushion frame (9) of the seat cushion (6) is pivotally supported by means of the axle pins (12) (12). Furthermore, a link mechanism for rotatably adjusting the seat (5) relative to the rotary fulcrum (8), i.e. a center of rotation of the seat (5), is mounted at the rearward portion of the seat cushion (6).

Figure 4:
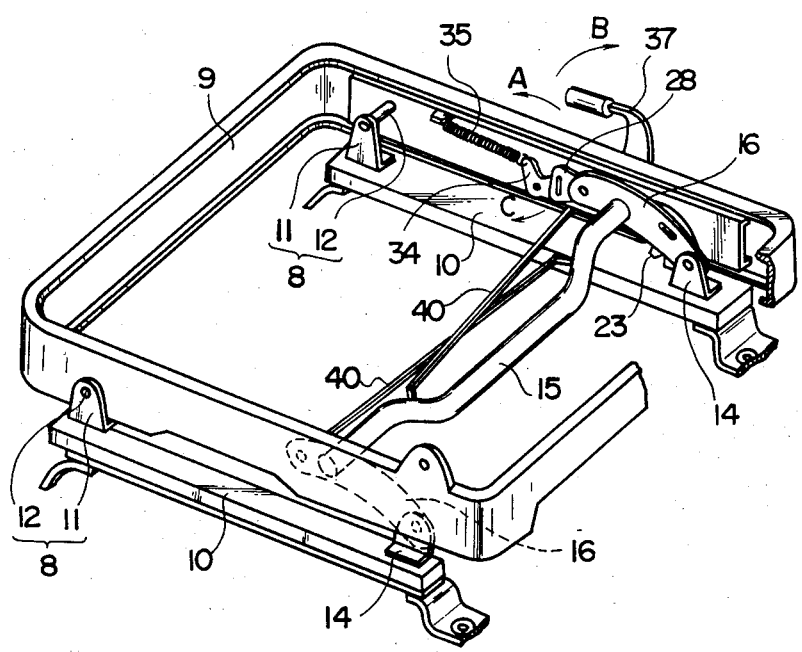
FIG. 4 is a perspective view of the part of a seat cushion of the seat as shown in FIG. 3.
Figure 5:
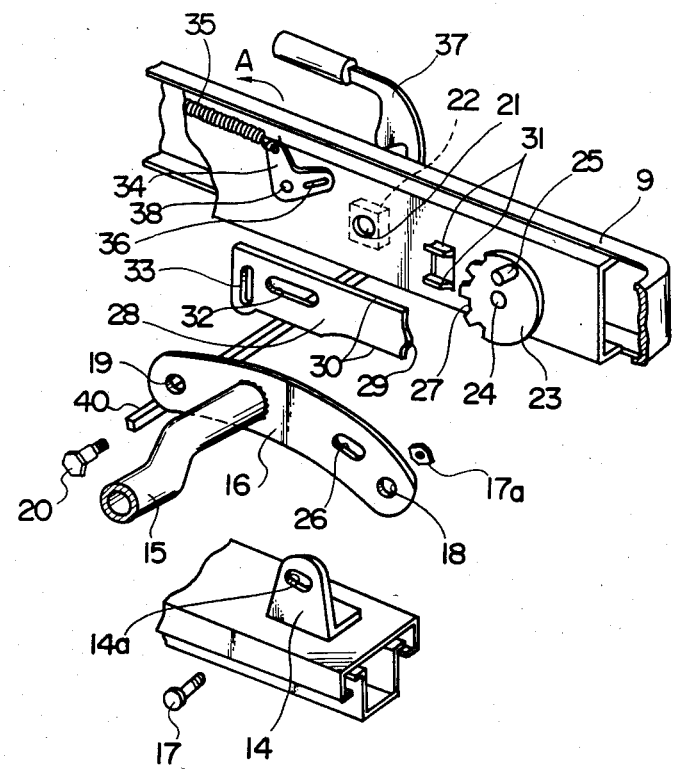
FIG. 5 is an exploded perspective view of a main part thereof.

In the link mechanism, brackets (14) (14) are mounted projectingly at the rearward portion of a pair of slide rails (10) (10) as shown in an expolded perspective view in FIGS. 4 and 5.

An axle pin (17) is loosely fitted into an elongated hole (14a) perforated in the brackets (14) (14), and the pin (17) is further inserted into an axle hole (18) perforated in one end portion of a pair of arc links (16) (16) which are fixed to the end portions of a support lever (15). In this manner, the axle pin (17) is fastened by means of a nut (17a), whereupon the pin (17) is allowed to move within the elongated hole (14a) to a desired extent. Further, a clamping bolt (20) is inserted into an axle hole (21) of the cushion frame (9) and also into an axle hole (19) perforated at the other end portions of the arc links (16) (16), with these elements being clamped together by a nut (22). Accordingly, a link mechanism is constituted.

As shown in FIG. 4, furthermore, torsion bars (40) (40) are fitted to a support lever (15) of the link mechanism so that a biasing force is always applied by the torsion bars (40) (40) to both arc links (16) (16) in the direction for rotating and raising the seat cushion (9) about the rotary fulcrum (8). Thus, it will be understood that the swinging movement of the arc link (16) in those pairs of link mechanisms causes the cushion frame (9) to rotate about the rotary fulcrum (8).

A lock mechanism is mounted on one side of the above-mentioned link mechanism (see particularly the upper portion of the embodiment shown in FIG. 5). As the lock mechanism, a disc (23) having teeth grooves (27) formed on the outer periphery thereof is pivotally fixed to the cushion frame (9) by means of an axle pin (24).

An offset pin (25) is projectingly arranged on the disc (23) eccentrically of the axle pin (24), and the offset pin (25) is inserted into an elongated groove (26) perforated in the arc link (16) so that the disc (23) may be rotated in association with the swinging movement of arc link (16) about the axle pin (17).

A rotation latching means is mounted on the disc. As such rotation latching means, a stopper (28) may be employed which has a protruding tooth (29) formed at the front part of the stopper (28) for engagement with the tooth grooves of the disc (23). The upper and lower side portions (30) (30) of the stopper (28) are formed in a parallel relation with each other, thereby allowing insertion of the stopper (28) into between a pair of guide members (31) (31) which are formed projectingly in a parallel spaced-apart relationship with each other. At the central portion of the stopper (28), there is perforated an elongated groove (32), into which an axle bolt (20) of the above mentioned link mechanism is inserted, so that the stopper (28) is supported in a slidable manner. To permit sliding movement of the stopper (28), the arrangement is such that a longitudinal groove (33) is perforated in the rearward end portion of the stopper (28), and into the longitudinal groove (33) is inserted an axle pin (36) formed projectingly on one end of a crank (34) which is formed in a substantially doglegged shape and pivotally fixed by means of an arbor (38) with the other end of the crank (34) being connected by a tension coil spring (35) so that the crank (34) will normally receive a movement in the direction of arrow (A).

The arbor (38) of the crank (34) is passed through the cushion frame (9) from the inside of the outside of the frame, with a manual lever (37) being fixedly secured to the forward end of the arbor (38).

Now, the action and operation of the seat lifter constructed as described above will be described below.

Figure 6:
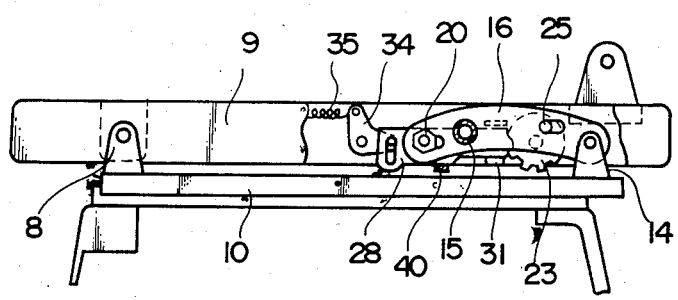
FIG. 6 and FIG. 7 are partially cut-away sectional side views explaining the action of the part of the seat cushion as shown in FIG. 4.

First of all, as shown with a solid line in FIG. 3, when the seat (5) is situated at the lowest position, the cushion frame (9) is in a latched condition and located adjacent to the slide rail (10) (See FIG. 6). This is, the rotation of the disc (23) is prevented due the fact that the protruding tooth (29) of the stopper (28) is engaged with one of the teeth grooves (27) of the disc (23), whereby the offset pin (25) of the disc (23) is secured against movement at a fixed position, thus placing the arc link (16) in a latched condition.

Next, when the seat (5) is changed to a desired position, the manual lever (27) is pulled up in the direction of arrow (B) as shown in FIG. 4. Then, the crank (34) is rotated in the direction of arrow (C) against the biasing force of the tension coil spring (35) and the axle pin (36) pulls back the stopper (28) while moving along the longitudinal groove (33) so that the protruding tooth (29) of the stopper (28) is disengaged from the teeth grooves (27) of the disc (23) so as to release the disc (23) from the latched condition, allowing the same to be free to rotate. Thereafter, a passenger may adjust the seat (5) to the position of a desired hip point (Hp) of the seat (5) as shown with a dash line from the position of a hip point of the seat (5) as shown in FIG. 3 for example. In that case, it is easy for the passenger to adjust his or her seating position, considering the upwardly-acting biasing force of the torsion bar (40) and a load of the passenger's own body weight.

Specifically, upon the unlocking of the disc (23), owing to the biasing force of the torsion bar (40), the arc links (16) (16) of the link mechanism are caused to swing upwardly relative to a pivotally fixing portion, i.e. the brackets (14) (14), which is a center of rotation of the arc links (16) (16), with the result that the rearward portion of the cushion frame (9) is raised up through the axle bolt (20) of the other end of the arc links. Accordingly, the front part of the cushion frame (9) is caused to rotate about the rotary fulcrum (8) and at the same time the disc (23) is caused to rotate in the direction of arrow (D) is response to the swinging movement of the arc link (16), whereby another one of the teeth grooves (27) is positioned in a facing relation with the protruding tooth (29) of the stopper (28).

Figure 7:
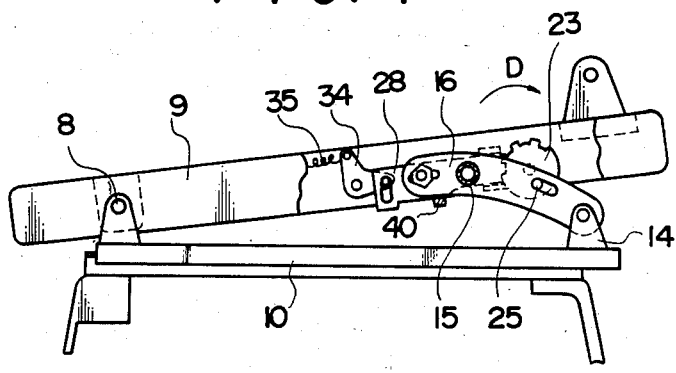

Then, in such a state, when the passenger releases the manual lever (37), the crank (34) is rotated in the direction of arrow (A) owing to the biasing force of the tension spring (35) and then the stopper (28) is forced out in interlocking with the tension coil spring (35), thereby causing the protruding tooth (29) to engage into the aforementioned another one of teeth grooves (27) of the disc (23). Thus, the rotation of the disc (23) is prevented and a position of the offset pin (25) is fixed, resulting in the arc link being in a latched condition, whereupon the situation as shown in FIG. 7 is retained as it stands. That is, the seat (5) may be retained at the position as shown with a dashed line in FIG. 3.

Of course, it is possible for a passenger to change a seating position into a desired one in the same manner as described above.

As described in detail hereinabove, according to the seat lifter of the present invention, it is possible to adjust the height of a hip point and a seat angle at the same time, by adjusting the elevating movement of the rearward portion of a seat relative to a rotary fulcrum set up at the front part of the seat cushion. Furthermore, according to the structure of the invention, most of the total load exerted on the arc links of the link mechanism is absorbed by the offset pin and the disc, which reduces a load applied to the teeth grooves of the disc, the stopper and other associated parts, and consequently increases the rigidity of the whole mechanism in the seat lifter against an externally applied force or load. Another advantage is found in that, since the high rigidly constructed link mechanism connects the cushion frame and the slide rail, the seat is prevented against a horizontal relative movement between the upper and lower portions thereof, and each constitutional element of the link mechanism is arranged within the height of the cushion frame, thereby reducing the thickness of the seat cushion and the guide rail, in an unobstructed manner.

I claim:
1. A seat lifter for a seat having a cushion frame for its seat cushion, said cushion frame being of a substantially channel shaped in section, and a slide rail disposed below said cushion frame, said seat lifter comprising:

- a rotary fulcrum defined on the forward portion of said cushion frame;
- a link mechanism mounted on the rearward portion of said cushion frame, said link mechanism being adapted for causing said seat to rotate about said rotary fulcrum, and comprising a pair of arc-shaped links each being at one end thereof pivotally connected to said slide rail and at the end thereof pivotally connected to said cushion frame;
- a lock mechanism arranged on said cushion frame in such a manner that the lock mechanism as a whole is disposed within the width of said cushion frame, said lock mechanism including:
  - a disc member having a plurality of teeth grooves formed on the outer periphery thereof, and
  - an offset pin projected from said disc eccentrically of the center of disc, said offset pin being slidably connected to one of said arc-shaped links; and
- rotation latching means for locking and unlocking the rotation of said disc member, said rotation latching means as a whole being arranged within the width of said cushion frame, and including:
  - a stopper slidably supported on said cushion frame such that it is movable in the longitudinal direction of said cushion frame;
  - a crank pivotally supported on said cushion frame; said crank being at one end thereof movably connected to one end portion of said stopper; and
  - biasing means connected to the other end of said crank so as to bias said stopper in a direction wherein the other end portion of said stopper is engaged into one of said plurality of teeth grooves of said disc member; and
- a lever fixedly connected to said crank at the pivot point of said crank.

2. A seat lifter in accordance with claim 1, wherein biasing means are provided for biasing said cushion frame in an upward direction relative to said rotary fulcrum through said arc-shaped links.

* * * * *